United States Patent [19]

Griffiths

[11] 4,422,619

[45] Dec. 27, 1983

[54] REMOTE VALVE OPERATING SYSTEM

[76] Inventor: Edward E. Griffiths, 3200 Polaris St., No. 23, Las Vegas, Nev. 89102

[21] Appl. No.: 285,520

[22] Filed: Jul. 21, 1981

[51] Int. Cl.3 .......................................... F16K 31/05

[52] U.S. Cl. ................................ 251/130; 137/637; 251/131; 318/563

[58] Field of Search ............... 137/637; 251/130, 131; 318/563, 626, 663; 91/527

[56] References Cited

U.S. PATENT DOCUMENTS 3,963,051 6/1976 Kuhlmann ........................ 137/637

*Primary Examiner*—Gerald A. Michalsky

*Attorney, Agent, or Firm*—Linval B. Castle

[57] ABSTRACT

A remote control system for controlling the movement of manually operable mechanisms such as hydraulic control valves for hydraulically operating the various cylinders on equipment such as cranes, or the like. A remote control unit includes a deadman switch and one or more potentiometers that provide control signals to a corresponding number of servo circuits. Each servo circuit drives a motor and a motor position sensing potentiometer that generates an error signal back to the servo. The motor rotation provides linear movement to the hydraulic control valve through a solenoid operated mechanical coupling. The servo circuit includes safety circuitry that detects open or shorted circuits in the cable to the remote unit and releases the solenoid coupling and returns the motor to a neutral position. When closed, the deadman switch diverts high pressure hydraulic fluid into the hydraulic systems so that, if desired, all hydraulic control valves may be preset to the desired position and, upon closing of the deadman switch, all preset hydraulic cylinders will become operative.

8 Claims, 2 Drawing Figures

REMOTE VALVE OPERATING SYSTEM

BACKGROUND OF THE INVENTION

This invention relates to the electronic control of mechanical actuators and particularly to the remote control of hydraulic or pneumatic valves such as used on cranes or other heavy equipment.

Substantially all heavy equipment is hydraulically operated and employs a bank of manually operated valves for controlling the application of high pressure fluid to the various hydraulic cylinders that apply the necessary high forces to position or operate the equipment. In many instances it is important that the operating engineer of such hydraulic equipment is located at some position that is remote from the bank of manual control valves. For example, a precise positioning of an article supported by a crane may require the crane operator to position himself next to the article and to operate the hydraulic valves by some remote controlling system such as disclosed in my U.S. Pat. No. 4,240,304. Or, an explosive device or some article located in an explosive or hazardous atmosphere may be positioned by an operator at a remote location by a remote control system such as disclosed in my pending U.S. application Ser. No. 183,020, filed Sept. 2, 1980, now U.S. Pat. No. 4,306,314. Both of these remote valve control systems provide for the actuation of one valve at a time and also the total cessation of operation upon the release of a deadman switch on the remote control unit.

The present system differs from the prior systems mentioned above in that an indefinite number of cylinder controlling hydraulic valves may be individually and simultaneously positioned from the remote location while a deadman switch is depressed. Or, if desired, any or all of the hydraulic control valves may be preset by the operator at the remote location and then simultaneously actuated by the closing of the deadman switch.

SUMMARY OF THE INVENTION

Briefly described, the invention includes a remote control handle with a deadman switch and a plurality of positioning potentiometers coupled by a remote cable to a corresponding plurality of electronic servo circuits, the outputs from which operate a corresponding number of positioning motors, each of which is connected through reduction gears and a friction clutch crank to a linear moving input shaft. The input shaft is telescoped into an output shaft connected to the manually operable hydraulic valve and the input and output shafts are locked together by a solenoid operated detent actuator only while the remote control system is operational, thereby permitting manual operation whenever desired. The electronic servo circuitry includes safety provisions that operate to neutralize the positioning motors and also release actuated hydraulic valves in the event of a short circuit or broken remote wire.

BRIEF DESCRIPTION OF THE DRAWINGS

In the drawings which illustrate the preferred embodiment of the invention.

DETAILED DESCRIPTION OF THE PREFERRED EMBODIMENT

Figure 1:
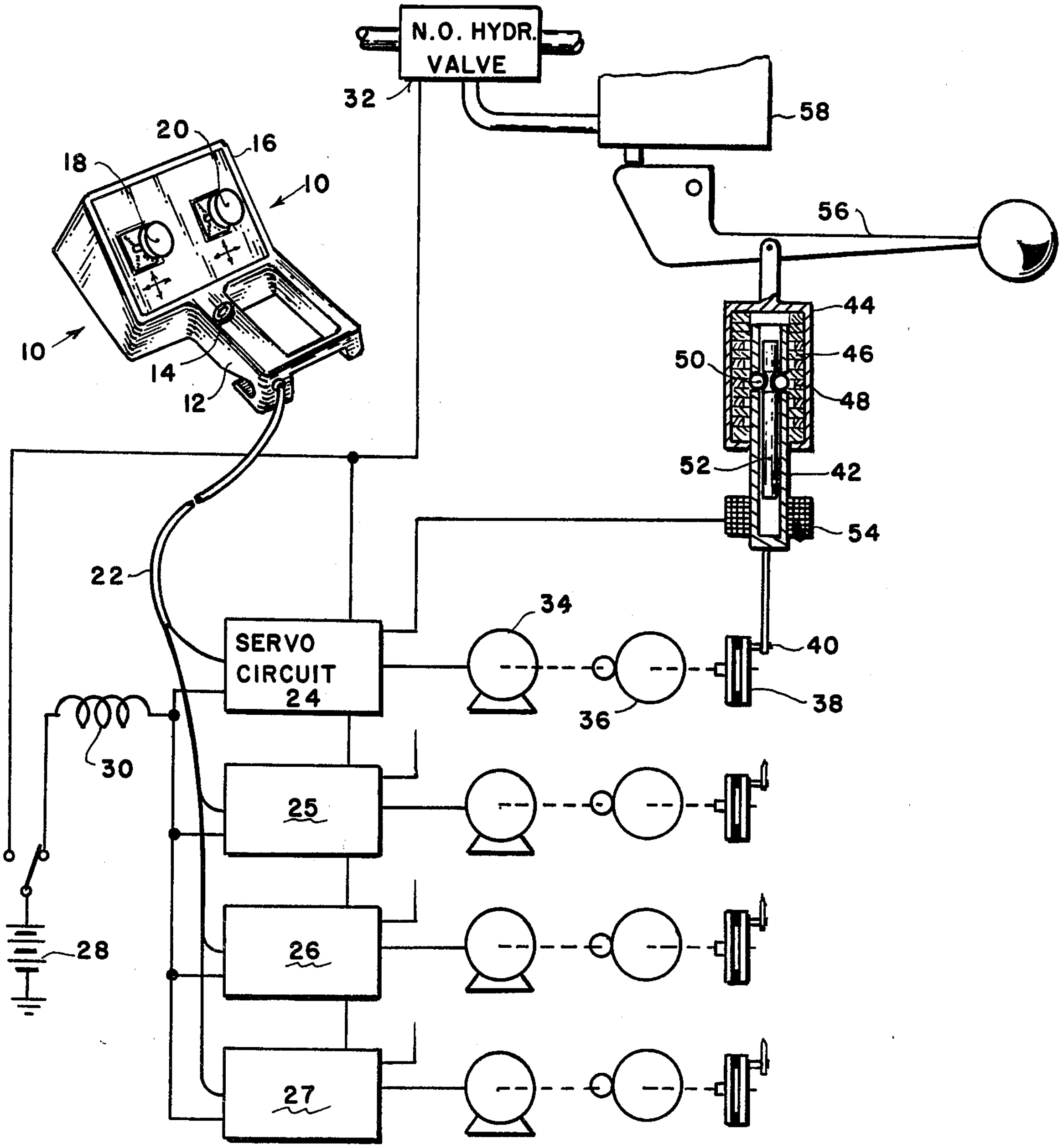
FIG. 1 is a block diagram illustrating a four-valve remote control unit coupled to four identical servo drive circuits, one of which is illustrated operating one of four identical manual hydraulic valve actuators.

The remote hydraulic valve control system of FIG. 1 includes a hand-held remote control unit 10 having a handle 12 with a conveniently located deadman switch 14 and a body portion 16 which contains valve positioning potentiometers (not shown). The potentiometers may be controlled by an appropriate number of joy stick controls such as the joy sticks 18 and 20, each of which operate two potentiometers to produce D.C. control signals that may be varied between upper and lower voltage limits. The D.C. control signal from each potentiometer, together with the normally open deadman switch circuit, is applied via a multiconductor cable 22 of suitable length to a corresponding servo circuit 24–27. Each servo circuit receives D.C. input power from a battery 28 which may be a 12-volt storage battery in the vehicle supporting the hydraulically operated equipment. The positive terminal of the battery 28 is connected to a double-throw switch, one leg of which is connected through a suitable radio frequency filter 30 to the several servo circuits 24–27, and the second leg of which is connected to a normally-open electric hydraulic fluid dump valve 32 which, when closed by the application of D.C. power, diverts the flow of hydraulic fluid circulating back into the system sump to the hydraulic cylinders of the equipment for local, or non-remote operation thereof.

Each of the several servo circuits such as the servo circuit 24 produces a D.C. output signal to a reversible D.C. motor such as the motor 34 which, in turn, is coupled via suitable reducing gears 36 to a friction clutch 38, the output of which includes a crank 40 coupled to an actuator input rod 42. Details of the valve actuator are described and claimed in my U.S. Pat. No. 4,240,304. As described in that patent, the input rod 42 telescopes into a tubular output rod 44 which contains, in the space between the input rod 42 and output rod 44, alternate first and second spacers 46 and 48, the inside diameters of which are greater than the outside diameter of the input rod 42. Two or more steel balls 50 positioned in radial holes through the input rod 42 may be radially moved by an actuating rod 52 having a section of reduced diameter and axially positioned within the input rod 42. The actuating rod 52 is longitudinally actuated by a solenoid 54 which, when electrically excited by a signal from the servo circuits 24–27, draw the actuating rod 52 downward so that the balls 50 within the reduced diameter area will be forced outward into the spaces provided by the spacers 48. The balls 50 therefore lock the input rod 42 to the output rod 44 so that rotation of the crank 40 on the friction clutch 38 will actuate the manually operated hydraulic control valve handle 56 and its associated hydraulic valve 58. As will be subsequently described in greater detail, any break or short circuit of a conductor in the remote cable 22 will result in a release of the solenoid 54, a return of the actuating rod 52 and the disengagement of the steel balls 50 between the input rod 42 and output rod 44, the automatic return of the motor 34 to a neutral or center position, and the release of hydraulic pressure to the system by the opening of the hydraulic dump valve 32.

Figure 2:
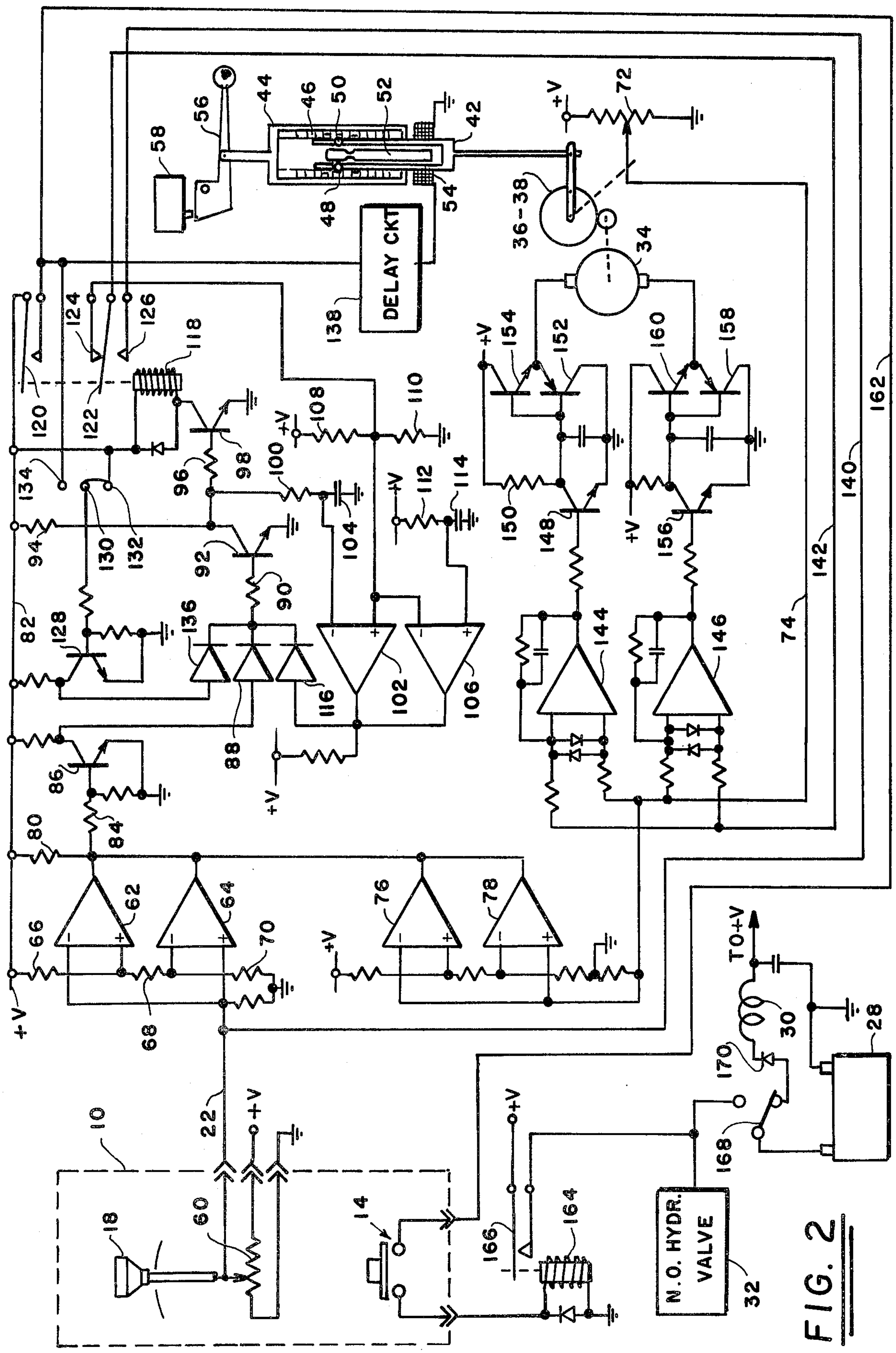
FIG. 2 is a schematic diagram illustrating one of the identical servo drive units of FIG. 1.

FIG. 2 schematically illustrates one of the servo circuits such as the circuit 24 with its associated motor 34 operating the hydraulic valve handle 56. As previously mentioned, all servos 24–27 are identical. The system may incorporate only one or two servo circuits or as many as is necessary for the proper control of the associated hydraulic equipment.

In FIG. 2, the remote control unit 10 is illustrated by dashed lines and the circuitry associated with only one joy stick control 18 is described. The movement of joy stick 18 controls the position of the center arm of a potentiometer 60, the end terminals of which are connected to system ground and a positive D.C. voltage source which, in the preferred embodiment, is obtained from the servo circuit and originally is derived from the 12-volt storage battery 28. The position control signal generated from the center arm of the potentiometer 60 is applied to the inverting input of a comparator 62 and to the non-inverting input of a comparator 64. Comparators 62 and 64 are preferably type 339 comparators and are connected together as a window comparator which tests the input signal derived from the potentiometer 60 to determine whether it lies between two prescribed voltage limits. In the embodiment illustrated, the limits are determined by the voltage divider comprising resistances 66, 68 and 70 coupled in series between positive voltage conductor 82 and ground reference. The values of the resistors are such that approximately 9 volts are applied to the non-inverting input of the comparator 62 and approximately 3 volts are applied to the non-inverting input of the comparator 64.

A second potentiometer 72 is adjusted by the output of the positioning motor 34 and its associated gearing 36 as explained in connection with FIG. 1. The center arm of this motor position sensing potentiometer generates a D.C. position signal which is transmitted via the conductor 74 to a second window comparator comprising the comparators 76 and 78 in an identical configuration with that window comparator comprising comparators 62 and 64. The comparators 62, 64, 76 and 78 are preferably a type 339, a comparator constructed with an output that is an NPN open-collector transistor with the emitter referred to ground. The outputs of all comparators 62, 64, 76 and 78 are coupled together and through a load resistance 80 of approximately 10 kilohms to the positive source conductor 82 and also through resistance 84 to the base of an NPN transistor 86. Therefore, when the input voltages from the joy stick potentiometer 60 and the motor sensing potentiometer 72 lie within the voltage window determined by the voltage divider of resistances 66, 68 and 70, the output from the combined window comparators will be positive to turn on the transistor 86.

The output from transistor 86 is taken from its collector and applied to the anode of a diode 88, the cathode of which is connected through resistance 90 to the base of an NPN transistor 92. The emitter of transistor 92 is grounded and the collector is connected through resistance 94 to the positive conductor 82 and also through resistance 96 to the base of the NPN transistor 98. The collector of transistor 92 is also coupled through a resistance 100 having a value of approximately 10 kilohms to the inverting input of the comparator 102 and also to ground through a 0.1 mfd. capacitor 104. The non-inverting input of comparator 102 is connected to the inverting input of a second comparator 106 and also to the junction of a voltage divider comprising resistances 108 and 110 connected in series between a positive voltage source and ground. Resistances 108 and 110 are selected to provide a voltage at their junction of approximately 5 volts. The non-inverting input of the comparator 106 is coupled to a positive voltage source through a 10 K resistance 112 and to ground through a 50 mfd. capacitor 114.

Comparators 102 and 106 are preferably type 393 comparators and are coupled together as a window comparator which will produce a positive output signal to the anode of the diode 116, whenever the 5-volt input derived from the voltage divider resistors 108 and 110 falls within the window established by the voltage on the inverting input of comparator 102 and the non-inverting input of comparator 106. It is apparent that if the anodes of the diodes 88 and 116 are at a potential below the threshold voltage of the diodes, transistor 92 will be off and a positive voltage signal will be applied to the base of transistor 98 and also to the inverting input of comparator 102. If the positive 12-volt signal is applied to both voltage reference inputs of the comparators 102 and 106, and two prescribed limits are both 12 volts so that the input signal derived from the voltage divider resistors 108 and 110 will always fall outside the established window unless the voltage on the collector of transistor 92 falls below the 5-volt input voltage established by the resistors 108 and 110, a condition that can exist when transistor 92 is conductive.

The emitter of transistor 98 is connected to ground and the collector is coupled through the excitation coil 118 of a double-pole double-throw relay to the positive voltage source conductor 82. The relay contacts associated with the excitation coil 118 include a pair of normally open contacts 120 an a double-throw contact assembly including a center arm contact 122 which is normally in contact with the contact 124 and which is thrown by excitation of the coil 118 to the normally open contact 126. As will be subsequently explained in greater detail, the relay excitation coil 118 is normally conducting current during the periods that the remote control system is in operation; therefore, during such excitation, the relay contacts 120 are closed and there is continuity through the contacts 122 and 126.

As explained in connection with FIG. 1, all of the servo circuits 24–27 are identical. Provision is made in each of the servo circuits for the termination of all remote operation in the event that any breaks are detected by the next adjacent servo. For example, if a circuit fault should occur in the servo circuitry 24, its excitation coil 118 would release and also all subsequent servos 25, 26 and 27 would become inoperative until such time as the fault could be remedied. This safety feature is provided by the NPN transistor 128, the emitter of which is grounded and the collector of which is coupled through a suitable resistor to the positive conductor 82. The base of transistor 128, in each of the servo units 24–27 is connected to a terminal 130 which may be coupled by a jumper to either the terminal 132 that is connected directly to the positive conductor 82 or to a terminal 134 which is connected to the positive conductor 82 via the normally open relay contacts 120. Therefore, on one selected servo, such as the servo 24, the jumper would interconnect terminals 130 and 132 so that the transistor 128 was always on. In the next subsequent servo 25, the terminal 130 would be connected to the terminal 134 in the servo circuit 24. That is, terminals 130 and 132 may be interconnected in the first servo circuit 24. However, in the next adjacent servo circuit 25, the terminal 130 would be interconnected with the terminal 134 in the adjacent circuit 24. In this manner, any errors, shorts or open circuits sensed by the circuit 24 would be reflected into the next servo circuit 25 and all subsequent servo circuits similarly interconnected.

For normal uninterrupted remote control operation, the positive voltage is applied to the base of transistor 128 to turn that transistor on. The output of transistor 128 is taken from its collector and applied to the anode of a diode 136, the cathode of which is coupled to the cathodes of diode 88 and diode 116. Therefore, any conduction through any one of the three diodes 88, 116 or 136 will apply a positive voltage to the base of transistor 92 to render that transistor conductive and to render the subsequent transistor 96 non-conductive to release the relay controlled by the coil 118.

Relay contacts 120, when closed, apply a positive voltage from the conductor 82 through a two-second delay circuit 138 to the solenoid coil 54 which, as previously explained in connection with FIG. 1, draws the actuating rod 52 from its normal position where its reduced diameter permits the balls 50 to disengage from the spacers 48 connected to the output shaft 44 that drives the hydraulic valve 56. The normal diameter of the actuating rod 52 therefore forces the balls 50 through the radial holes in the input shaft 42 to interlock the shaft 42 with the output shaft 44.

The handle position control potentiometer 60 operated by the joy stick 18 in the remote unit 10 is coupled via a conductor 140 to the normally open contact 126 of the relay. The normally closed contact 124 of this relay is connected to the junction of the voltage dividing resistors 108 and 110 which, as previously mentioned, is at a potential of approximately 5 volts. The voltage divider comprising these resistors 108 and 110 may be referred to as a "home position" divider and the voltage developed at the junction of these resistors should be such as to position the motor 34 at a desired neutral position in the event that control from the joy stick 18 is lost. In the particular embodiment being described, this "home" voltage is approximately 5 volts but this voltage level may obviously be altered to any desired level between the voltage level on conductor 82 and ground in order to accommodate any particular servo system. Thus, the home voltage of approximately 5 volts is applied to the normally closed contact 124 of the relay whereas the remote control sensing voltage from the joy stick 18 is applied to the normally open contact 126 of the relay. As previously mentioned, during normal operation of the remote control system, the relay coil 118 is excited so that contacts 122 and 126 are interconnected. Contact 122 is connected via a "sense" conductor 142 to the inverting input of a comparator 144 and to the non-inverting input of a comparator 146. The voltage generated by the motor position sensing potentiometer 72 is applied via conductor 74 to the non-inverting input of the comparator 144 and the inverting input of comparator 146. Comparators 144 and 146 may be a type 1458 comparator and are provided with suitable voltage input limiting diodes and conventional feedback circuitry, and control the direction of rotation and drive of the motor 34.

The output of the comparator 144 is applied to the base of an NPN transistor 148, the emitter of which is grounded and the collector of which is coupled to a positive voltage source through a suitable resistance 150. The collector of the transistor 148 is also coupled to the base of a PNP transistor 152 and to the base of an NPN transistor 154. The collector of transistor 154 is connected to a positive voltage source and the emitter is connected to the emitter of the transistor 152, the collector of which is grounded. The output from the comparator 146 is connected to an identical driver circuit comprising the driver transistor 156, the emitter of which is grounded and the collector of which is coupled to the bases of the PNP transistor 158 and the NPN transistor 160. The interconnection of the emitters of transistors 152 and 154 are coupled to one pole of the D.C. motor 34 whereas the interconnected emitters of transistors 158 and 160 are connected to the opposite pole of the D.C. motor 34. Thus, whenever the voltage generated by the motor position sensing potentiometer 72 is more positive than the sensing voltage introduced by the conductor 142, the comparator 144 will produce an output that will render transistor 148 conductive while comparator 146 will produce no output and its associated driver transistor 156 will be non-conducting. When transistor 148 is on, its collector is substantially at ground potential so that NPN transistor 154 is off and the PNP transistor 152 conducts to ground the illustrated upper terminal of motor 34. Comparator 146, being off, also turns off its driver transistor 156 so that the collector of transistor 156 and the base of the NPN transistor 160 are positive. Transistor 160 therefore conducts to apply the positive potential to its emitter and therefore to the illustrated bottom terminal of the motor 34 to drive that motor in one direction. Motor 34 is coupled to a reduction gear 36 and thence to a friction clutch 38 as explained in connection with FIG. 1. The crank output of clutch 38 applies linear movement to the input shaft 42 and also to the arm of the motor position sensing potentiometer 72 to drive that potentiometer to a point where its output voltage corresponds to the voltage produced by the joy stick potentiometer 60, or by the home voltage produced by the voltage divider resistors 108 and 110 in the event of the broken conductor from the remote unit 10 and the resulting release of the relay contacts 122 and 126.

Normally open relay contacts 120, when closed by the excitation coil 118 apply D.C. voltage via the conductor 162 to one terminal of the normally open deadman switch 14 in the remote control unit 10. The opposite terminal of the switch 14 is coupled back to the servo circuit and to ground through a relay excitation coil 164 which, when actuated, closes relay cntacts 166. One of the relay contacts 166 is connected to a positive voltage source and the other contact is connected to the normally open hydraulic dump valve 32 which, as previously explained, will bypass all hydraulic fluid into the system sump until the valve is closed, at which time it applies the high pressure fluid to the hydraulic valves and cylinders operating the associated equipment. The positive pole of a battery 28 is connected to the center pole of a single pole two-throw switch 168. During operation of the remote control system described herein, the switch 168 is positioned to apply D.C. power through a diode 170 and a radio frequency filter choke 30 to the positive voltage source conductors in each of the servo circuits such as the circuit 24. Whenever it is desired to manually operate the various hydraulic valves 56 associated with the equipment, the switch 168 is toggled to its opposite position to apply a 12-volt current directly to the normally open hydraulic valve 32 and to remove all power from the servo circuits. In this way, high pressure fluid is available to the various cylinders and the manually operable hydraulic valve 56, now disconnected from the motor drive circuit by the removal of current through the solenoid coils 54, may be conveniently operated manually.

OPERATION

In a remote control operation, the window comparators comprising the comparators 62 and 64 test the input control signal from the joy stick potentiometer 60 to determine whether that signal lies within a predetermined voltage window or whether any of the conductors within the cable 22 from the remote unit may be broken or shorted to a high voltage conductor. As long as the signal introduced from the joy stick potentiometer is within the certain limits, the window comparator produces an output signal to turn on transistor 86. Similarly, any break or high voltage short circuit in the conductor 74 from the motor position sensing potentiometer 72 will alter the output of that window comparator comprising comparators 76 and 78. As long as transistor 86 is on, its output into the diode 88 is low and the diode is non-conductive.

The transistor 128 is always connected to a 12-volt source in one of the several servo circuits but in the remaining circuits, is connected to the terminal 134 which will deliver the 12-volt current only when the volt-sensing relay coils 118 are excited. Thus, whenever transistor 128 is conductive, its output is substantially at ground potential and there is no conduction through its associated diode 136. The transistor 92 is therefore off and a high D.C. voltage is applied from its collector to the base of transistor 98 to render that transistor conductive and to excite the coil 118. The RC circuit comprising resistor 100 and capacitor 104 provides a short delay to the input of the window comparator comprising comparators 102 and 106 so that the window comparator will not "lock on" to provide conduction through the diode 116 during the normal turn-on rise time of the voltage in the system. Similarly, the RC circuit comprising resistance 112 and capacitance 114 provides a delay of approximately 50 milliseconds to the threshold window into the comparator 106. Therefore, whenever the remote system is first initiated, the transistor 98 will immediately become conductive to close relay contacts 120 and interconnect the contacts 122 with contact 126. The two-second delay provided by the delay circuit 138 will thereafter engage the input shaft 42 with the output shaft 44 so that hydraulic valve 56 may be operated by the motor 34.

The comparators 144 and 146 control the direction of rotation and drive of the motor as previously described so that the motor position sensing potentiometer 72 will follow the remote control joy stick potentiometer 60. It should be noted that, if desired, all hydraulic valves such as the valve 56 that is associated with the remote control system may be preset prior to the depressing of the deadman switch 14 since actuation of this switch only operates to apply high pressure hydraulic fluid to the system. On the other hand, the deadman switch may first be depressed and the joy stick potentiometers may thereafter be adjusted so that their associated motors will instantly control the now pressurized hydraulic valves.

In the event of a broken conductor or the conductor short-circuited to a high voltage source in the multiconductor cable 22 or the conductor 74 from the motor position sensing potentiometer 72, the various window comparators will instantly cause the transistor 86 to become non-conductive whereby high voltage from the D.C. conductor 82 is applied through the diode 88 to turn on the transistor 92. The collector of transistor 92 is now substantially at ground potential and this turns off the transistor 98 and releases the excitation coil 118. Release of coil 118 will open the contacts 120 to release the solenoid coil 54 and will close the contacts 122 and 124 so that the voltage generated by the home voltage divider comprising resistors 108 and 110 will now become the sensing voltage applied through conductor 142 to the motor drive comparators 144 and 146. As previously mentioned, the selection of the resistors 108 and 110 in the home voltage divider is selected so that the motor will return to a desired neutral position and the motor position sensing potentiometer 72 will therefore be positioned to correspond to the voltage produced by the divider resistors 108 and 110. Upon the release of coil 118, power is removed from the deadman switch 14, and contacts 166 of relay 164 will open to remove excitation of the hydraulic bypass valve 32 and any electrically actuated clutches, or the like, that may be used in the supply of hydraulic power to the associated equipment.

I claim:

1. A remote control system for remotely controlling the movement and position of a manually operable mechanism, said control system comprising:

a remote control unit including a manually operable deadman switch and a manually adjustable remote control potentiometer for generating a control signal;

a drive motor;

a motor position sensing potentiometer coupled to said drive motor and positioned by the rotation of said drive motor for generating a position signal;

solenoid controlled interconnecting means coupled to the output of said drive motor and to the manually operable mechanism for positioning said manually operable mechanism in response to rotation of said drive motor;

a servo circuit coupled between said drive motor and said remote control unit and responsive to said control signal from said manually adjustable remote control potentiometer and said position signal from said motor position sensing potentiometer for rotating said motor to a position where said position signal corresponds to said control signal;

a solenoid control circuitry controlled by said servo circuit for actuating said solenoid controlled interconnecting means during operation of the remote control system; and safety circuitry within said servo circuit for disabling said solenoid control circuitry and for returning said drive motor to a predetermined neutral position whenever said control signal exceeds predetermined upper and lower voltage limits.

2. The remote control system claimed in claim 1 wherein said safety circuitry includes window comparator circuitry responsive to said control signal and predetermined upper and lower voltage reference levels for producing a first output signal when the level of said control signal is within said upper and lower voltage reference limits, the existence of said first output signal causing the excitation of a relay and the application of power to said solenoid control circuitry.

3. The remote control system claimed in claim 2 wherein said servo circuit includes motor driving comparator circuitry for comparing the levels of said control signals and of said position signals and for producing an output motor driving signal of a polarity that determines the direction of rotation of said drive motor.

4. The remote control system claimed in claim 3 wherein the excitation of said relay closes circuitry between said remote control potentiometer and said motor driving comparator circuitry, and wherein the release of said relay opens the circuitry to said remote control potentiometer and applies to said motor driving comparator a home signal of a voltage level that drives said drive motor to a predetermined neutral position.

5. The remote control system claimed in claim 4 wherein the system includes a plurality of identical manually adjustable remote control potentiometers for controlling a corresponding plurality of drive motors from a corresponding plurality of identical servo circuits having safety circuitry, the safety circuitry in one of said servo circuits including a transistor that is maintained conductive by the presence of system power for producing an excitation signal to said relay, said transistor in each subsequent servo in the remainder of said plurality of servo circuits being responsive to excitation and release of the relay in the next previous servo circuit, whereby a fault causing the release of said relay in one of said plurality of servo circuits will cause release of said relays in all following servo circuits of said plurality.

6. The remote control system claimed in claim 4 wherein said drive motor is connected through speed reducing gears to a friction clutch, said clutch having an output crank coupled to an input shaft and to an output shaft driving said manually operable mechanism, said input and output shafts being interlocked by said solenoid controlled interconnecting means.

7. The remote control system claimed in claim 6 wherein said motor position sensing potentiometer is responsive to the output rotation of said speed reducing gears.

8. The remote control system claimed in claims 1, 2, 4, 5, 6 or 7 wherein said system includes a normally open electrically controlled hydraulic valve that normally returns pressurized hydraulic fluid to a system sump and which, when electrically actuated, applies said pressurized fluid to operating devices, said hydraulic valve being actuated by the closure of said deadman switch in said remote control unit.

* * * * *